(12) United States Patent
Shima (10) Patent No.: US 7,362,459 B2
(45) Date of Patent: Apr. 22, 2008

(54) NETWORK DEVICE AND PRINTER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 849 days.

(21) Appl. No.: 09/987,534

(22) Filed: Nov. 15, 2001

(65) Prior Publication Data

US 2002/0101611 A1 Aug. 1, 2002

(30) Foreign Application Priority Data

Nov. 17, 2000 (JP) ............................ 2000-350818
Oct. 17, 2001 (JP) ............................ 2001-319926
Oct. 17, 2001 (JP) ............................ 2001-319927

(51) Int. Cl.
*G06F 3/12* (2006.01)
*G06F 15/00* (2006.01)

(52) U.S. Cl. ...................... 358/1.15; 358/1.13; 358/1.1

(58) Field of Classification Search ............... 358/3.23, 358/1.15, 1.16, 1.13, 1.9, 1.14, 1.1, 1.6, 1.11, 358/1.17, 1.18, 407, 468; 709/203, 217, 709/218, 219, 226, 242, 245, 249; 347/2, 347/3, 5; 399/1, 8

See application file for complete search history.

(56) References Cited

U.S. PATENT DOCUMENTS

| | | | | |
|---|---|---|---|---|
| 5,303,336 | A | * | 4/1994 | Kageyama et al. ......... 358/1.15 |
| 5,367,618 | A | * | 11/1994 | Ishida ......................... 715/542 |
| 5,580,177 | A | * | 12/1996 | Gase et al. ..................... 400/61 |
| 5,852,744 | A | * | 12/1998 | Agatone et al. ............... 710/17 |
| 5,960,206 | A | * | 9/1999 | Barsness et al. ............. 717/174 |
| 6,269,481 | B1 | * | 7/2001 | Perlman et al. .............. 717/178 |
| 6,452,692 | B1 | * | 9/2002 | Yacoub ...................... 358/1.15 |
| 6,930,785 | B1 | * | 8/2005 | Weyand et al. .............. 358/1.1 |

FOREIGN PATENT DOCUMENTS

| | | |
|---|---|---|
| JP | 05-100804 | 4/1993 |
| JP | 05-297850 | 11/1993 |
| JP | 06-198999 | 7/1994 |
| JP | 06-266334 | 9/1994 |

(Continued)

OTHER PUBLICATIONS

Appeal Examiner's Inquiry for Japanese patent application No. 2001-319926 dated Jul. 29, 2005.

*Primary Examiner*—Dov Popovici
(74) *Attorney, Agent, or Firm*—Mattingly, Stanger, Malur & Brundidge, P.C.

(57) ABSTRACT

A network device generates print data in accordance with information resources received from outside, and can then easily install or update a color conversion table, a printer driver, etc., necessary for generating print data. Print related information necessary for generating print data is automatically acquired from a prescribed location on the network at a prescribed time by the network device, such as when the printer is turned on. When the prescribed location where the print related information is installed changes to a different prescribed location, the print related information which is acquired from the prescribed location on the network contains information concerning the different prescribed location on the network to be accessed upon the next acquisition of print related information. In some embodiments, the network device is incorporated into the printer, so that the printer automatically acquires and installs the print related information necessary for generating print data.

2 Claims, 11 Drawing Sheets

FOREIGN PATENT DOCUMENTS

| | | |
|---|---|---|
| JP | 07-129343 | 5/1995 |
| JP | 09-016355 | 1/1997 |
| JP | 10-207657 | 8/1998 |
| JP | 10-229533 | 8/1998 |
| JP | 10-340163 | 12/1998 |
| JP | 11-053130 | 2/1999 |
| JP | 11-203079 | 7/1999 |
| JP | 11-227269 | 8/1999 |

* cited by examiner

Fig.11

NETWORK DEVICE AND PRINTER

FIELD OF THE INVENTION

The present invention relates to a device comprising a function for generating print data in accordance with information resources received from outside, and specifically to a device such as a network board or printer capable of acquiring a color conversion table or printer driver, etc. necessary for generating print data via the network.

DESCRIPTION OF THE RELATED ART

Figure 4A:
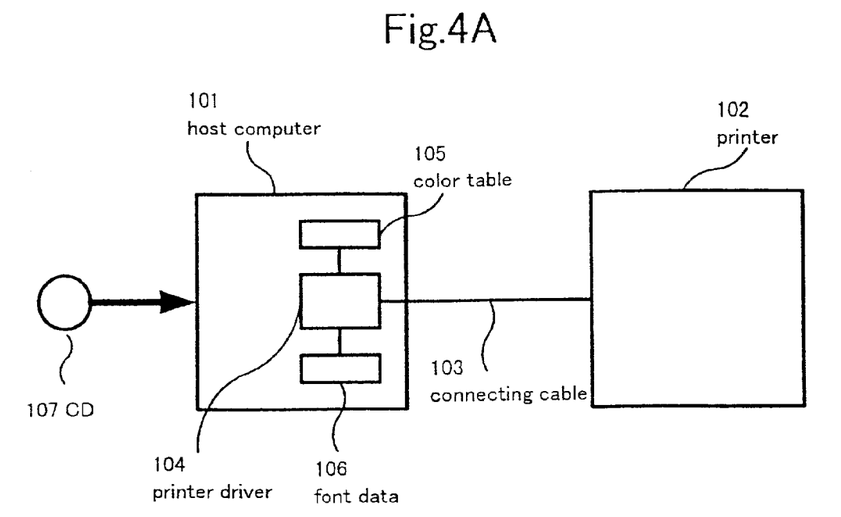
FIG. 4 is a block diagram showing a relationship between the conventional printer and a host computer.

FIG. 4 is a block diagram showing the relationship of a conventional printer and host computer. FIG. 4A shows a case in which a printer 102 is directly connected to a host computer 101 by a connecting cable 103. In this case, when documents or images from the host computer 101 are printed, a printer driver 104 installed on the host computer 101 generates print data from information resources to be printed (information of a format such as TXT (TeXT), HTML (HyperText Markup Language) or JPEG (Joint Photographic Experts Group)), in a prescribed format (a printer-compatible format, i.e. a format described by printer-interpretable language (printer control language)), and sends the print data to the printer 102. Thereafter, the printer 102 interprets the received print data, and executes printing in accordance with the requirement thereof. When the printer driver 104 generates print data, a color table 105 (color conversion table) necessary for the color conversion process, a font data 106 necessary for text data process and so on is used.

The printer driver 104, color table 105 and font data 106, etc. used in printing are generally prepared for each model of printer to generate printer-specific print data which is applicable to the printer 102 in which printing is executed. Accordingly, in the case of FIG. 4A, when the printer 102 is first used, the printer driver 104, color table 105 and font data 106, etc. for the printer 102 must be installed to the host computer 101 from a CD 107, etc. which is provided with the printer 102. The font data 106 which already existed in the host computer 101 may be used, so that the installation thereof is omitted.

In the installation, the host computer 101 searches the printer 102 for identification information via the connecting cable 103, and the printer driver 104, etc. corresponding to identification information sent back from the printer 102 is installed from the CD 107.

Figure 4B:
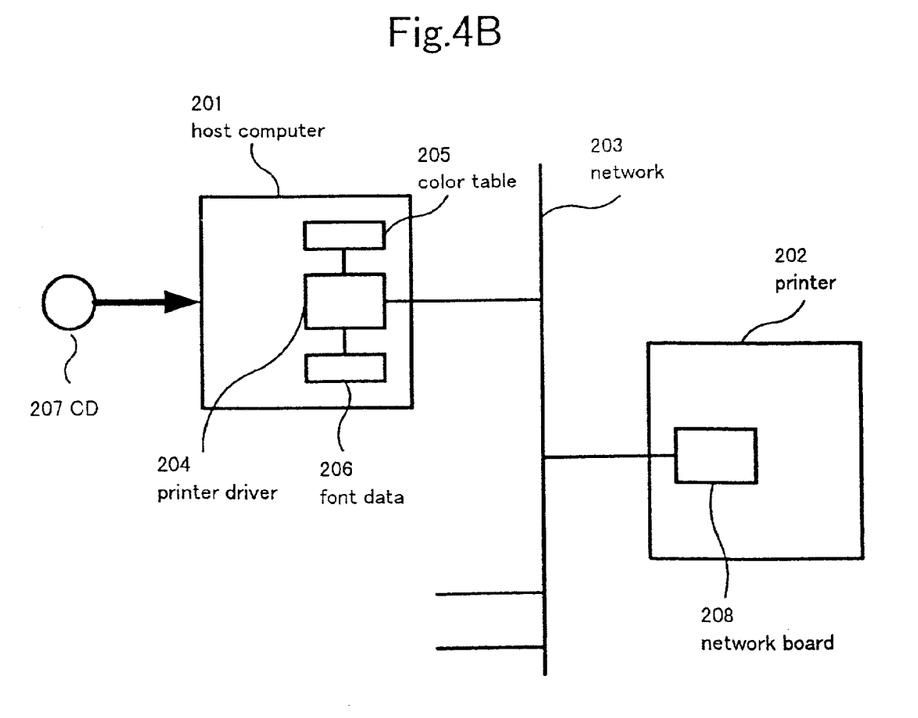

An example shown in FIG. 4B is a case in which a printer 202 comprises a network board 208, and is connected to a network 203 such as a LAN (Local Area Network). In this case, although it is possible to request printing from a plurality of host computers 201 connected to the network 203 to the printer 202, even in such case, the print data specific to the printer 202 is generated in each of the host computers 201, so that each of the host computer 201 requires a printer driver 204, color table 205 and font data 206, etc. for the printer 202.

The installation of these items is, as is the case in FIG. 4A, conducted by acquiring these items from a CD 207 or a prescribed location on the network 203 in accordance with the identification information which is acquired from the printer 202.

In this manner, in the conventional printer, printing has always been executed via a host computer, and print data applicable to a printer has been generated in the host computer. Accordingly, a printer driver, etc. specific to each model of printers has been prepared in the host computer upon commencing use of the printer or updating the printer driver, etc.

SUMMARY OF THE INVENTION

As the requirements of a printer are diversified due to the latest rapid diffusion of the internet and the development of various kinds of digital equipment connected to the internet, it is assumed that there is a case in which printing constantly via the host computer is not efficient. For example, it is assumed that a case in which the printed instruction is directly given from any device other than a computer, such as mobile phone, will increase. Accordingly, hereafter, a printer is desired that is capable of independently acquiring information resources to be printed from the network, generating print data, and executing printing not via the host computer.

Such printer must comprise a printer driver, etc. to independently generate print data. Therefore, as one method, a method for giving a function of the printer driver to a network device (e.g. network board or network box) controlling an interface function with the network which is equipped in the printer, or used by being connected to the printer is conceivable. In this case, there is a problem how the printer driver, etc. which varies according to each model of printers to be used, is easily installed on the network device to foster versatility of the network device, and to make it applicable to various models of printers.

Moreover, as the printer driver, etc. is frequently updated, the updating operation to a new version may occur at any time even after installing the printer driver. Accordingly, it is desirable that the updating operation can also be easily conducted.

An object of the present invention is to provide a network device for providing an interface function with the network for a printer, wherein a color conversion table or printer driver, etc. necessary for generating print data or executing printing can be easily installed and updated.

To achieve this object, one aspect of the present invention is that a network device for generating print data in accordance with information resources received outside, and sending the print data to a printer by itself accesses a prescribed site on the network at a prescribed time such as when it is tuned on, and appropriately downloads and uses print related information such as the color conversion table or printer driver, etc. Accordingly, in the present invention, as the network device itself appropriately acquires the necessary print related information, it facilitates the installation and updating operation, so that there is no inconvenience for an operator of the printer (network device) or the host computer. Moreover, the network device comprising such function can be easily applied to a different model of printers, and may thus be a versatile network device.

Furthermore, another object of the present invention is to provide a printer comprising a function to generate print data in accordance with information resources received outside, and to execute printing, wherein a color conversion table or printer driver, etc. necessary for generating print data or executing printing can be easily installed and updated.

To achieve this object, another aspect of the present invention is that a printer for generating print data in accordance with information resources received outside, and executing printing independently accesses a prescribed site on the network at a prescribed time such as when it is turned on, and appropriately downloads and uses print related information such as color conversion table or printer driver.

Consequently, according to the present invention, as a printer itself appropriately acquires necessary print related information, it facilitates the installation or updating operation, and there is no inconvenience for an operator of the printer or the host computer.

DESCRIPTION OF THE PREFERRED EMBODIMENTS

Embodiment 1

Hereafter, explained by referring to the drawings is Embodiment 1 of the present invention. However, this Embodiment is not limited to the technical scope of the present invention. Concerning the drawings, the same or similar drawings are explained by putting the same reference number or reference mark.

Figure 1:
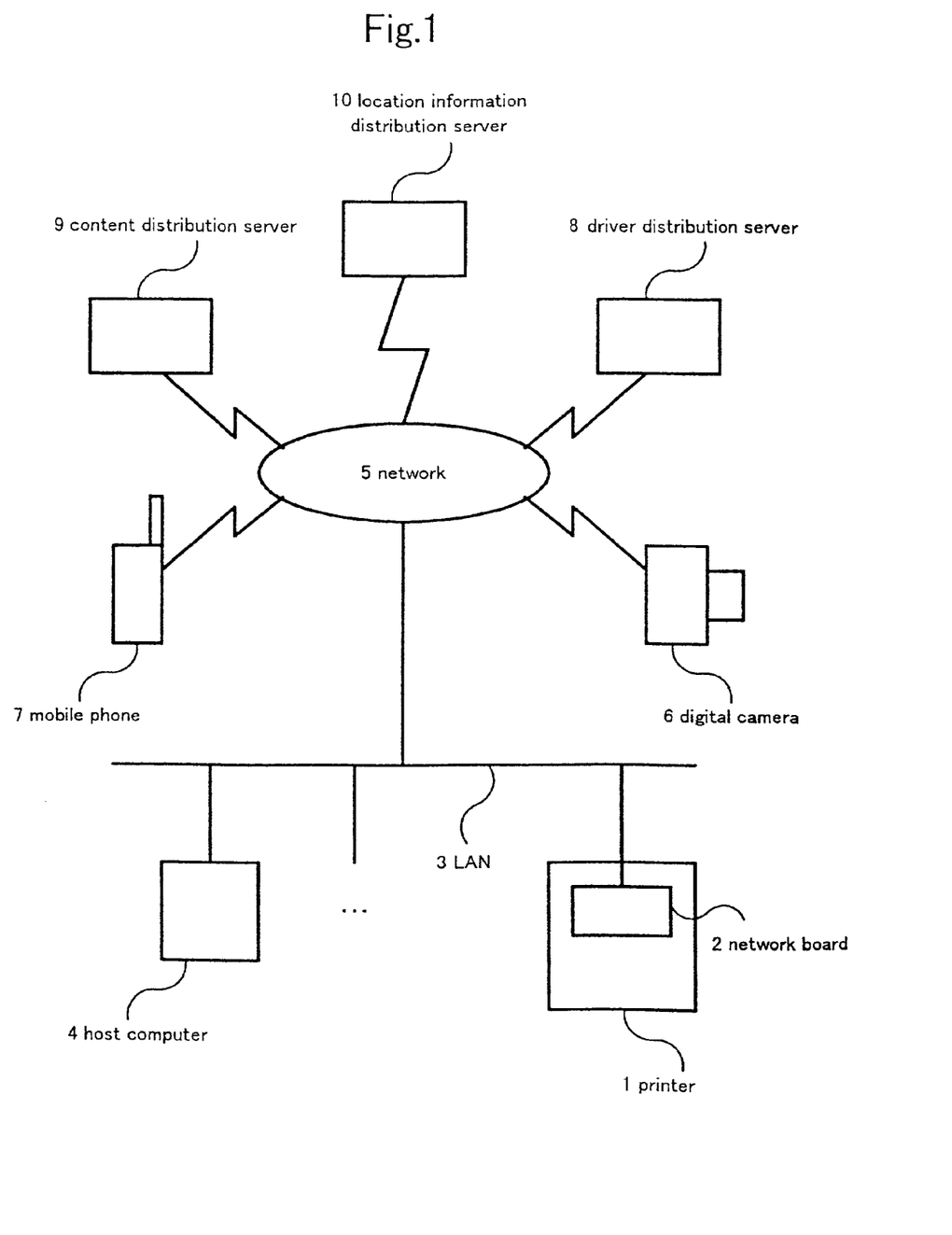
FIG. 1 is a block diagram of the network related to Embodiment 1 of the present invention.

FIG. 1 is a block diagram of a network according to Embodiment 1 of a printer utilizing the present invention. In the drawing, a printer 1 is the printer utilizing the present invention, and a network board 2 installed in the printer 1 is the network device according to the present invention. The printer 1 is connected to a LAN 3 and a network 5 via the network board 2. The network 5 includes the internet as well as the network of a home environment (e.g. a network, in which the home gateway is a server, and the printer is a client).

Figure 7:
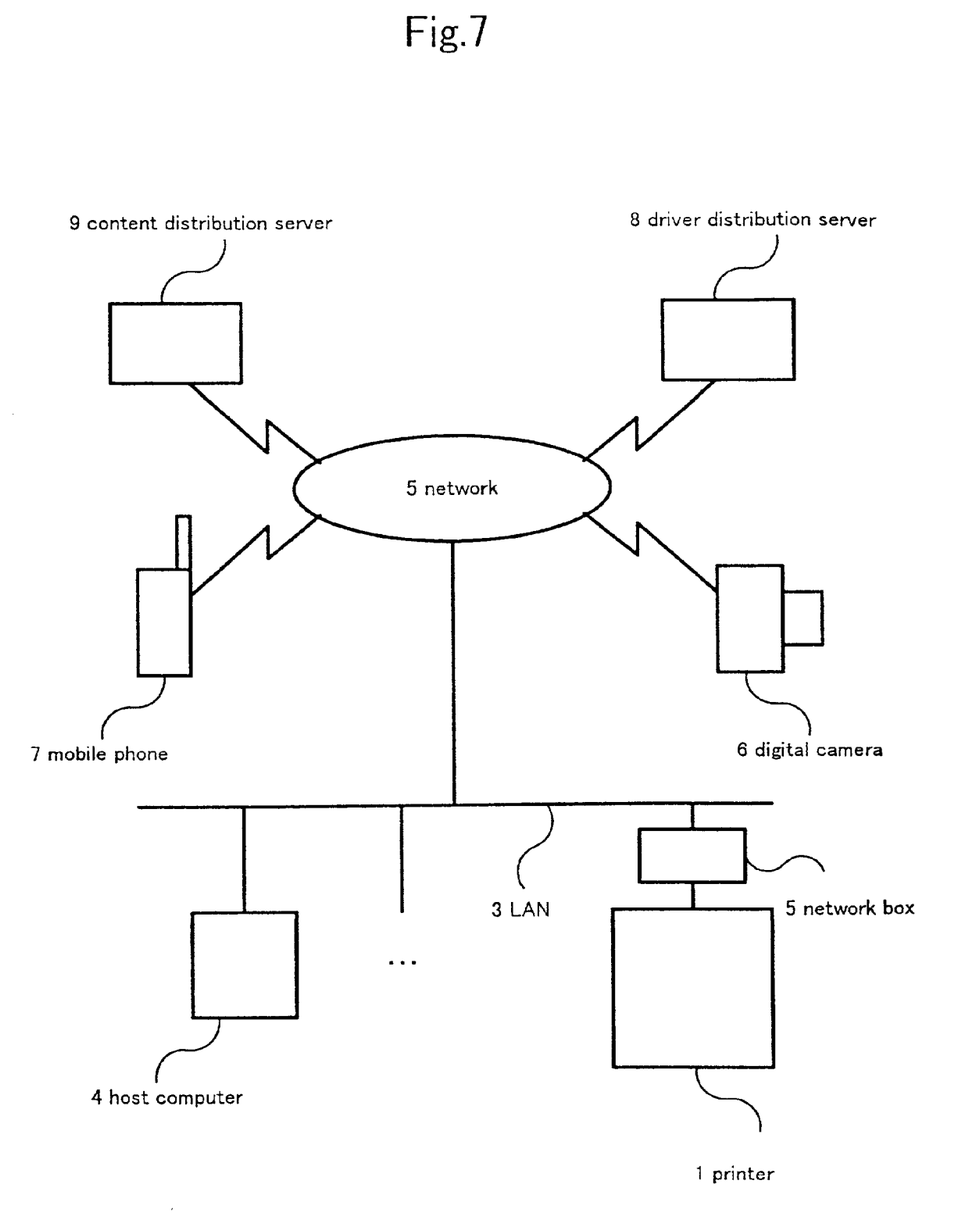
FIG. 7 is a block diagram of another network related to Embodiment 1.

Here, in FIG. 1, although the network board 2 installed in the printer is disclosed as a network device, the network device is not necessarily limited to such configuration, but may be another configuration such as a network box, which is singly implemented independently of the printer (see FIG. 7).

Moreover, although only one is shown in the drawing, a number of content distribution servers 9 which provide various kinds of content (information resources to be printed) are situated on the network 5.

Furthermore, a driver distribution server 8 for providing a printer driver, etc. for the printer 1 is equipped. This driver distribution server 8 is, for example, provided by each printer manufacturer, and prepares information necessary for generating print data (hereinafter referred to as the "print related information") for each model of printer such as printer driver (for example, current printer driver), color conversion table (color table), font data or font renderer.

If there exists a plurality of the driver distribution server 8, a location information distribution server 10 may be provided which comprises a function to compatibly memorize what print related information is stored on any of the driver distribution servers 8, and to send location information of the driver distribution server 8 where requested print related information is stored, according to the inquiry from the network device.

The network board 2 according to Embodiment 1 comprises a function for receiving print data sent from a host computer 4 such as a personal computer connected to the LAN 3, and sending the print data to the printer 1 as the printer 1 executes printing thereof in accordance with the print data.

Moreover, the network board 2 also comprises a function for acquiring content to be printed from the content distribution server 9, generating print data in accordance with the content, and sending the print data to the printer 1 as the printer 1 executes printing thereof.

The usage of these functions enables, for example, pursuant to the instructions from a mobile phone 7 via the network 5, the network board 2 to acquire the instructed content from the prescribed content distribution server 9 to execute printing according to the content in the printer 1, or to receive image data of a digital camera 6 connected to the network 5 to print out in the printer 1. Furthermore, it also enables any prescribed information to be collected from a plurality of the content distribution server 9 pursuant to the stored job, to print out in a prescribed layout every morning.

Furthermore, the content include image data, and text data as well as intermediate data (e.g. band image data) generated in the process of generating the print data. For example, if the intermediate data is sent from the host computer 4, or is acquired from the content distribution server 9 as content, the network board 2 may generate print data in accordance with the intermediate data, and send the print data to the printer 1.

Embodiment 1 ensures the above matters by equipping the network board 2 with the function for acquiring information resources or the function for generating print data that had conventionally been performed by the host computer 4. Accordingly, the network board 2, for generating the print data, must be comprised of print related information necessary for generating print data such as printer driver, color table or font data which is applicable to the printer 1.

The network board 2 according to this Embodiment which comprises such configuration and functions as explained referring to FIG. 1 is characterized in that the network board 2 itself acquires the printer driver, etc. for the printer 1 necessary for generating print data from a prescribed location on the network 5 (e.g. the driver distribution server 8) at a prescribed time, and thereby, intends to reduce the operation of installation or updating of the printer driver, etc.

Figure 2:
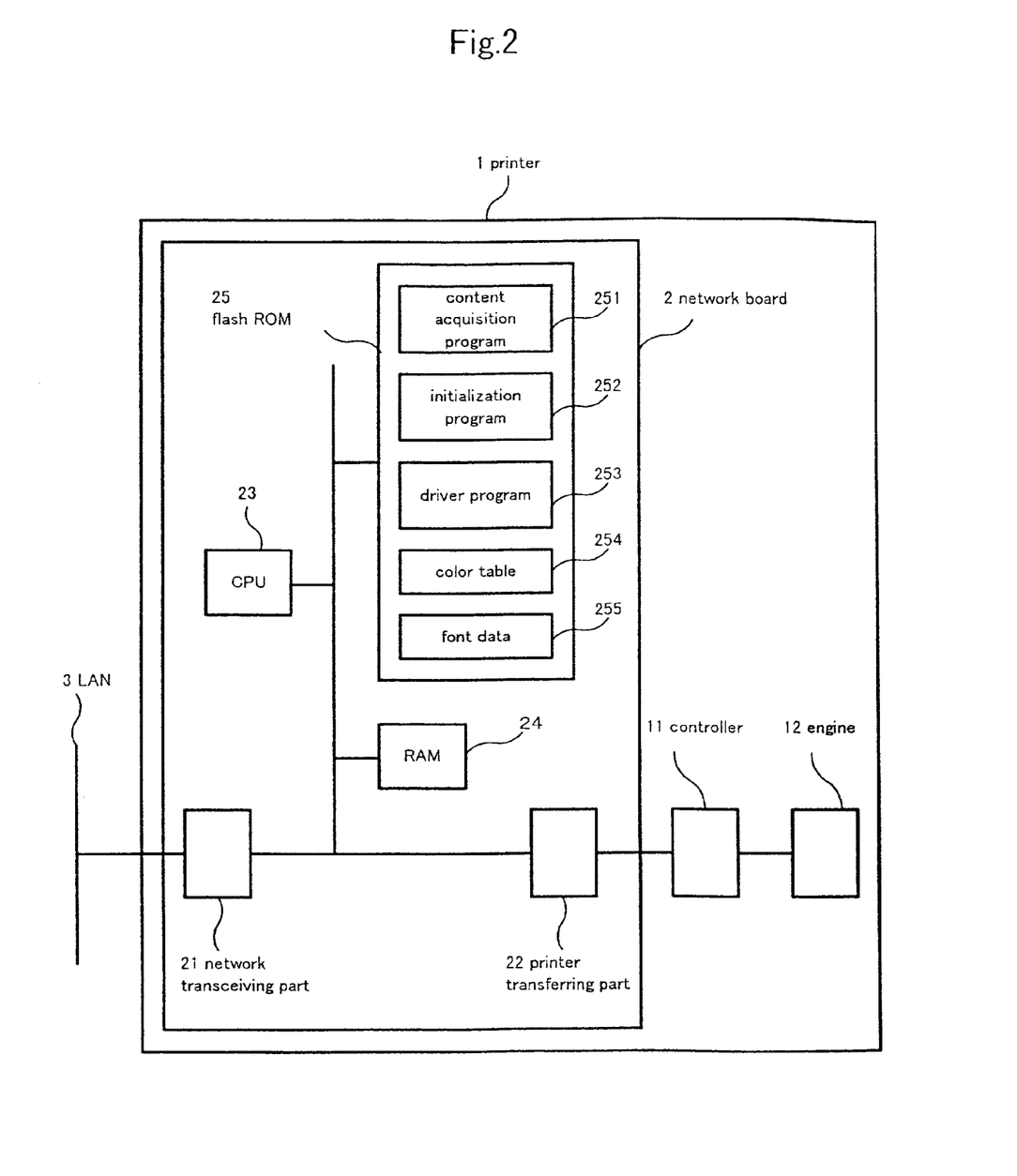
FIG. 2 is a drawing showing the internal configuration of a network board 2 related to Embodiment 1.

FIG. 2 is a drawing showing an internal configuration of the network device 2 according to Embodiment 1. As shown in the drawing, the printer 1 consists of the network board 2, a controller 11 and an engine 12, etc.

The network board 2, as described above, receives print data via the network such as the LAN 3, or acquires information resources to be printed to generate print data.

The controller 11, as in the case of the conventional device, receives print data, proceeds with a binary process thereunder, and sends a printing instruction in synchronization with the engine 12, and controls the engine 12. The engine 12 executes the actual printing in accordance with the printing instruction.

The network board 2 comprises a network transceiving part 21 which undertakes an interface function with the network such as the LAN 3, and a printer transferring part 22 which is a part where the print data received or generated by the network board 2 itself is sent to the controller 11.

In a flash ROM 25, various kinds of programs or data to execute the above functions that the network board 2 comprises, or print related information is stored, which is utilized in a CPU 23 and RAM 24 to actually proceed with various kinds of processes.

A content acquisition program 251 is a processing program for acquiring information resources to be printed as instructed from the host computer 4 or mobile phone 7, etc., via the LAN 3 or the network 5, from a prescribed location (content distribution server 9). As information resources, for example, information of a format such as TXT (TeXT), HTML (HyperText Markup Language) or JPEG (Joint Photographic Experts Group) is considered.

A driver program 253 is a program to realize a function of the printer driver. The driver program 253 judges whether the information received in the network transceiving part 21 is the content or print data. In the case of print data, the print data is directly sent to the controller 11, and otherwise, print data to be sent to the controller 11 is generated in accordance with the content, upon which a color table 254 and a font data 255, etc. similarly installed in the flash ROM 25 are used. The driver program 253, color table 254 and font data 255, etc., as described above, are the print related information specific to a model of printers, and must be prepared to be applicable to the printer 1. Among these, despite not being shown in the drawing, a program for rendering font, etc. (font renderer) is prepared as necessary.

Finally, an initialization program 252 is a part to realize a function characteristic in the network board 2, which proceeds with a process to acquire the print related information such as the driver program 253, color table 254, etc. and font data 255 applicable to the printer 1 where the network board 2 is installed (the version applicable to the printer 1), from a prescribed location on the network 5 (driver distribution server 8) at a prescribed time such as when the printer 1 is turned on.

Figure 3:
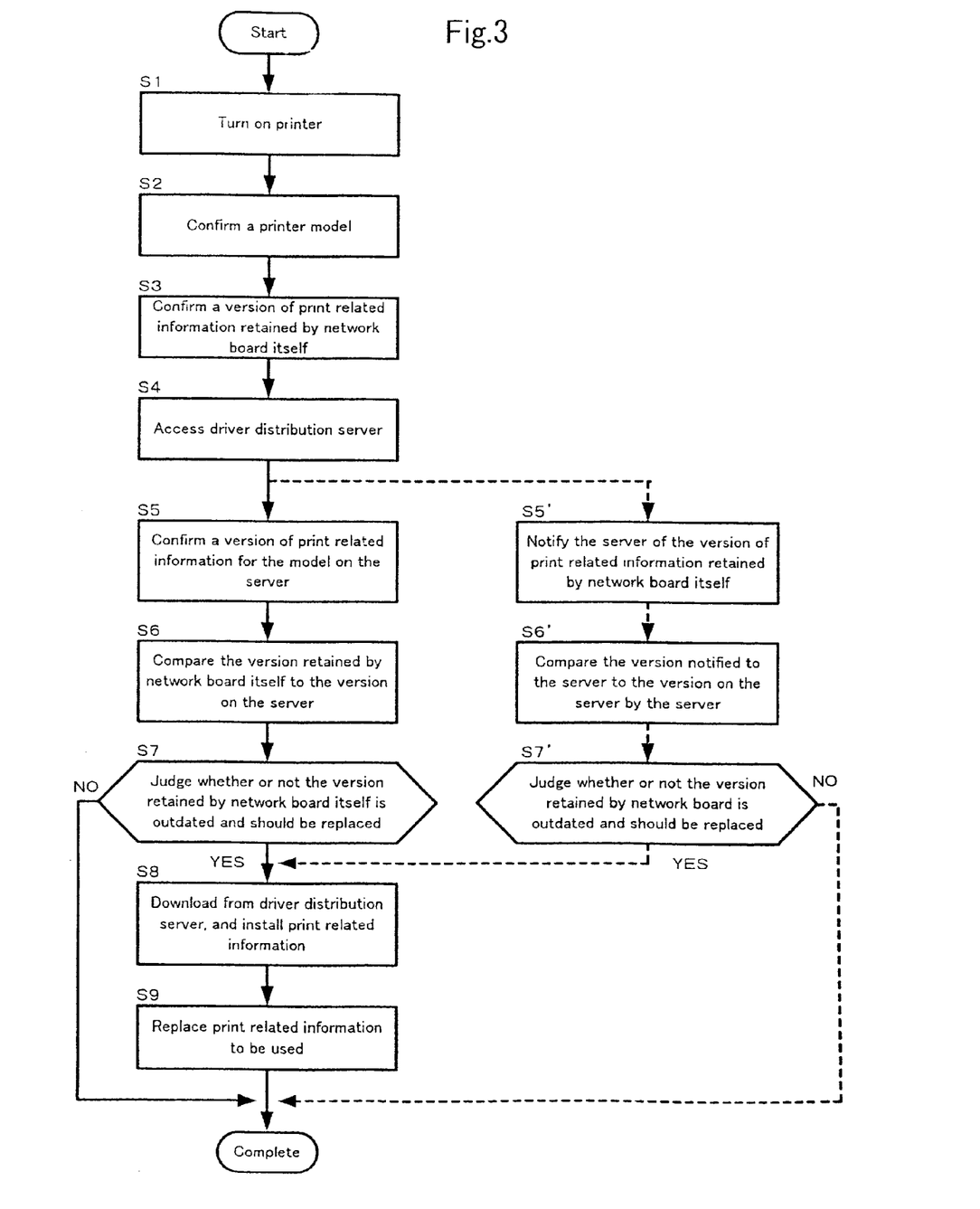
FIG. 3 is a flowchart showing a process according to an initialization program 252 of Embodiment 1.

The inside of the printer 1, specifically inside of the network board 2, is configured as explained above, and hereafter, explained is a processing flow for acquiring print related information in accordance with the initialization program 252. FIG. 3 is a drawing showing an example of the processing flow.

As shown in FIG. 3, firstly, the printer 1 is turned on (FIG. 3, step S1). Upon receipt of the signal thereof, the network board 2 confirms the printer 1 model in accordance with the initialization program 252 (FIG. 3, step S2). Specifically, the network board 2 acquires identification information such as the ID number of the printer 1 from the controller 11. Next, the network board 2 confirms a version of print related information, such as the driver program 253, color table 254, font data 255 and font renderer for the printer 1 (a model of the printer 1) stored in the flash ROM 25 (FIG. 3, step S3).

Next, the network board 2 accesses the driver distribution server 8 on the network 5 which distributes print related information for the printer 1 via the network transceiving part 21, LAN 3 and network 5 (FIG. 3, step S4).

Here, the network board 2 may be configured to first access the location information distribution server 10. In such case, the network board 2 sends inquiry information, including identification information of print related information for the printer 1 to the location information distribution server 10. The location information distribution server 10 comprises a database to store the location information of the driver distribution server 8 which prepares print related information by corresponding to the identification information of the print related information, and upon receiving the inquiry information from the network board 2, extracts the applicable location information from the database in accordance with the identification information of the print related information in the inquiry information, and sends the location information to the network board 2. Thereby, the network board 2 may access the driver distribution server 8 where the print related information for the printer 1 is stored in accordance with the received location information.

Next, the network board 2 confirms a version of the print related information for the printer 1 prepared in the driver distribution server 8 (FIG. 3, step S5).

Next, the network board 2 compares the version of the print related information retained on the network board 2 itself which is confirmed in the step S3 to the version on the server which is confirmed in the step S5 (FIG. 3, step S6).

As a result of the comparison, if these versions are the same, or the version retained on the network board 2 itself is newer (FIG. 3, step S7, "No") the network board 2 does not proceed with any specific process as it has already retained the applicable print related information.

On the other hand, if the version retained on the network board 2 itself is older, and must be replaced with the newer print related information (FIG. 3, step S7, "Yes"), the print related information prepared in the driver distribution server 8 is downloaded, and the older print related information of the flash ROM 25 is replaced by the downloaded new print related information (FIG. 3, step S8).

Thereafter, upon generating print data, the updated version of the print related information is used by the time of the next update (FIG. 3, step S9). Moreover, even if the print related information retained on the network board 2 itself is an old version, it may be considered that a replacement is not required in the case of there being little difference between the old version and the version prepared in the driver distribution server 8, for example, in the case of performance improvement only and not in order to correct a malfunction.

The comparison between the versions of the print related information, judgement whether or not the version is updated, and updating may be conducted with respect to each unit, the version of which is managed (e.g. every driver program or color table).

A processing flow describing with dotted line in FIG. 3 describes an example of another processing feature. In the processing flow describing with straight line in FIG. 3, the network board 2 conducts the comparison between the versions of the print related information retained on the network board 2 itself and the version of the print related information retained on the driver distribution server 8, and judges whether or not print related information is downloaded thereunder; on the contrary, in this example, the driver distribution server 8 conducts such comparison and judgement. Accordingly, as shown in FIG. 3, step S5, S6 and S7 are respectively replaced to step S5', S6' and S7'.

Specifically, the network board 2, after accessing the driver distribution server 8 (FIG. 3, step S4), notifies the driver distribution server 8 (FIG. 3, step S5') of the version of the print related information retained by the network board 2 itself, and the driver distribution server 8 conducts the comparison (FIG. 3, step S6'), and judges, according to the results of the comparison, whether or not the print related information of the network board 2 should be replaced (FIG. 3, step S7'). The result of the judgement is sent to the network board 2, and thereafter the process is the same as the case in the processing flow describing with straight line.

Furthermore, if the network board 2 does not originally own the print related information for the printer 1, naturally "Yes" is selected in the step S7 of FIG. 3, and the version prepared by the driver distribution server 8 is downloaded and installed.

Moreover, before accessing the driver distribution server 8 (or location information distribution server 10) (FIG. 3, step S4) or downloading from the driver distribution server 8 (FIG. 3, step S8), a step that an operator of the printer 1 (or network board 2) judges whether or not to proceed, with the following processes may be adopted, which enables an adequate response even in the case where it is not preferable to connect to the network 5, or it is not desirable to update the existing print related information.

In the example according to FIG. 3, although it is determined that the time when the network board 2 acquires the print related information is the time when the power is tuned on, alternatively, it may be the time when the printer 1 (network board 2) receives the instruction of a user. For example, it is the time when the buttons provided the printer 1, etc., are touched, or the printer 1 (network board 2) receives the instruction thereof from a user via the LAN 3.

If the location where the driver distribution server 8 for providing the printer driver, etc. (e.g. an address on the network 5) is installed changes, and such change is previously known to the driver distribution server 8, the information of the future location to be accessed may be included in the downloaded print related information to be sent to the network board 2.

As explained according to FIG. 3, in the printer 1, as the network board 2 itself updates the version of the print related information such as the driver program 253, etc., there is no inconvenience in this installation and updating operation. Moreover, even if the network board 2 is used in any other printer, as the network board 2 itself acquires and installs the print related information applicable to the printer, the work of the operator is reduced. As the network board 2 may be broadly utilized in a plurality of the printer 1, the mass production cost of the network board 2 may be reduced.

Embodiment 2

Next, explained is Embodiment 2 of the present invention referring to the drawings.

Figure 8:
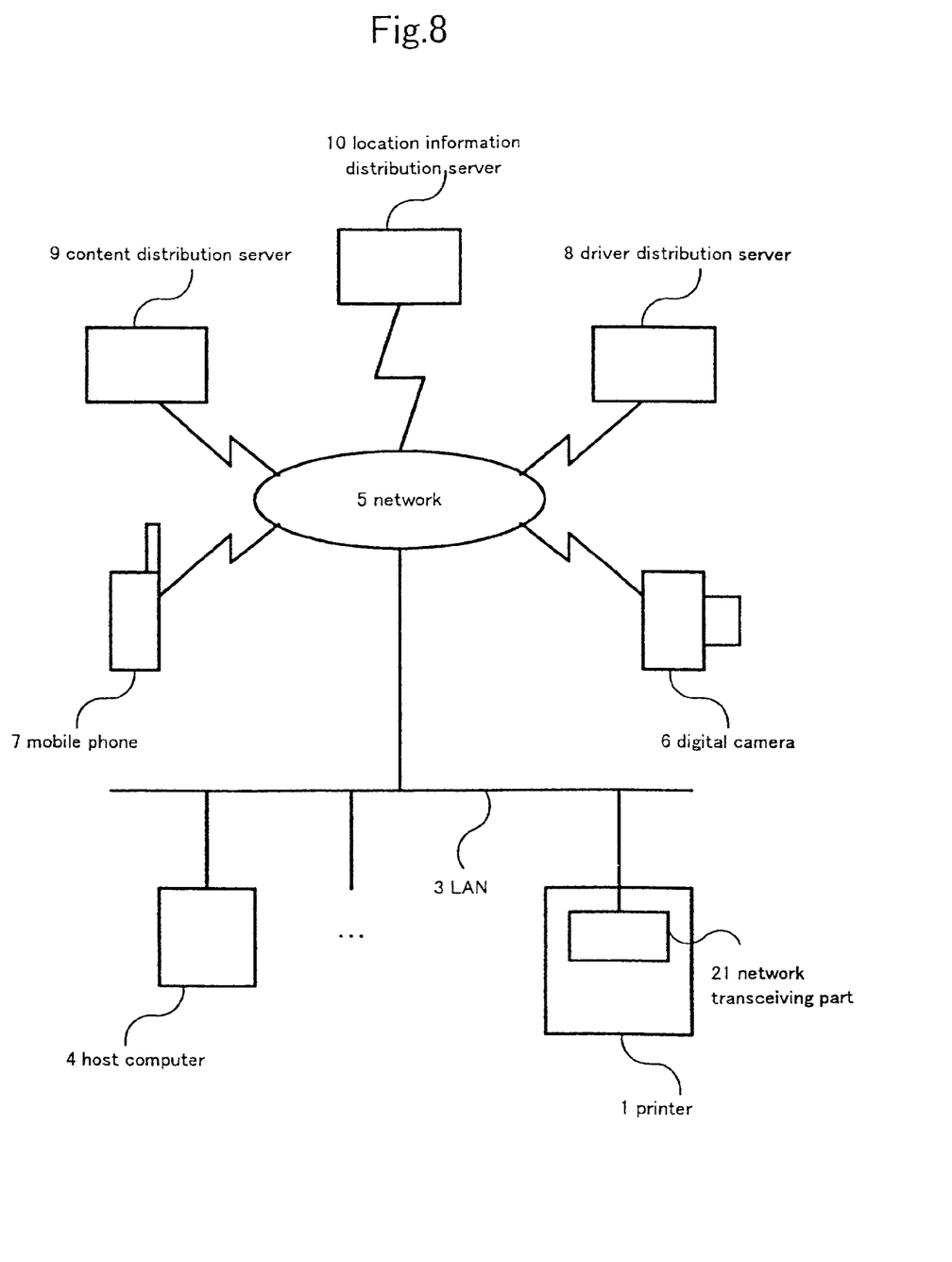
FIG. 8 is a block diagram of a network related to Embodiment 2 of the present invention.

FIG. 8 is a block diagram of the network according to Embodiment 2 of a printer utilizing the present invention. In the drawing, a printer 1 is a printer according to the present invention. The printer 1 internally comprises a network transceiving part 21, through which the printer 1 is connected with a LAN 3 and a network 5. The network 5 includes the internet as well as the network of a home environment (e.g. network, in which the home gateway is a server, and the printer is a client).

Moreover, although only one is shown in the drawing, there exist a number of content distribution servers 9 which provide various kinds of content (information resources to be printed) on the network 5.

Furthermore, a driver distribution server 8 for providing the printer driver, etc. for the printer 1 is installed. The driver distribution server 8 is, for example, provided by each printer manufacturer, and prepares print related information for each model of printer such as printer driver (e.g. the current printer driver), color conversion table (color table), font data or font renderer.

If there exists a plurality of the driver distribution server 8, a location information distribution server 10 may be installed which comprises a function to compatibly memorize what print related information is stored on any of the driver distribution servers 8, and to send location information of the driver distribution server 8 where the requested print related information is stored in accordance with the request from the printer.

The printer 1 according to Embodiment 2 comprises a function for receiving print data sent from a host computer 4 such as a personal computer connected to the LAN 3, and executing printing in accordance with the print data.

Moreover, the printer 1 also comprises a function for acquiring content to be printed from the content distribution server 9 by itself, generating print data in accordance with the content, and executing printing.

The usage of these functions enables, for example, pursuant to the instruction from a mobile phone 7 via the network 5, the printer 1 to acquire the instructed content instructed by the prescribed content distribution server 9 to execute printing, or to receive image data of a digital camera 6 connected to the network 5 to print out in the printer 1. Furthermore, it also enables any prescribed information to be collected from a plurality of the content distribution server 9 pursuant to the stored job to be printed out in a prescribed layout every morning.

Furthermore, the content include image data, and text data, as well as intermediate data (e.g. band image data) generated in the process of generating print data. For example, if intermediate data is sent from the host computer 4, or is acquired from the content distribution server 9 as content, the printer 1 may generate print data in accordance with the intermediate data, and execute printing.

Embodiment 2 ensures the above matters by equipping the printer 1 with the function for acquiring information resources or the function for generating the print data that had conventionally been performed by the host computer 4. Accordingly, the printer 1, for generating the print data, must be comprised of print related information necessary for generating print data such as printer driver, color table and font data, etc. which is applicable to the printer 1.

The printer 1 according to Embodiment 2 which comprises such configuration and function as explained referring to FIG. 8 is characterized in that the printer 1 itself acquires the printer driver, etc. for the printer 1 necessary for generating print data from a prescribed location on the network 5 (e.g. driver distribution server 8) at a prescribed time, and thereby, intends to reduce the installation or updating operation of the printer driver, etc.

Figure 9:
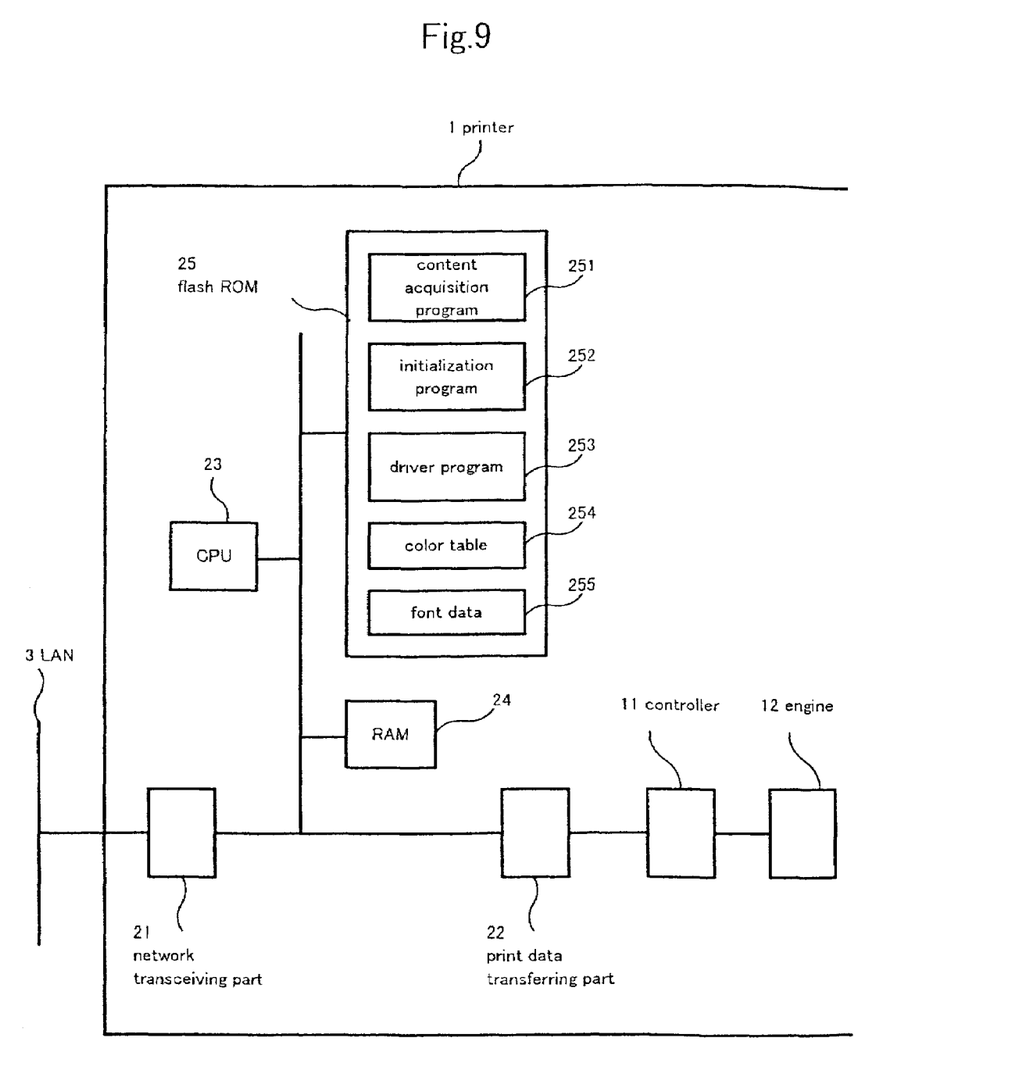
FIG. 9 is a drawing showing the internal configuration of a printer 1 related to Embodiment 2.

FIG. 9 is a drawing showing an internal configuration of the printer 1 according to Embodiment 2. As shown in the drawing, the printer 1 consists of a network transceiving part 21, print data transferring part 22, CPU 23, RAM 24, flash ROM 25, controller 11 and engine 12, etc.

The Printer 1, as described above, receives print data via the network such as the LAN 3, or acquires information resources to be printed to generate print data.

The controller 11, as in the case of the conventional device, receives print data, proceeds with a binary process thereunder, sends print instructions, etc. in synchronization with the engine 12, and controls the engine 12. The engine 12 executes the actual printing in accordance with the print instruction.

The network transceiving part 21 acts as an interface function with the network such as the LAN 3. The print data transferring 22 is the part where the print data received or generated by the printer 1 itself is transferred to the controller 11.

In the flash ROM 25, various kinds of programs, data or print related information to execute the above functions comprised in the printer 1 are stored, which are utilized in the CPU 23 and RAM 24 to actually proceed with various kinds of processes.

A content acquisition program 251 is a processing program for acquiring information resources to be printed as instructed from the host computer 4 or mobile phone 7 via the LAN 3 or the network 5 from a prescribed location (content distribution server 9). As information resources, for example, information of a format such as TXT (TeXT), HTML (HyperText Markup Language), or JPEG (Joint Photographic Experts Group) is considered.

A driver program 253 is a program to realize a function of the printer driver. The driver program 253 judges whether the information received in the network transceiving part 21 is the content or print data. In the case of print data, the print data is directly sent to the controller 11, and otherwise, print data to be sent to the controller 11 is generated in accordance with the content, upon which the color table 254 and font data 255, etc. similarly installed in the flash ROM 25 are used. The driver program 253, a color table 254 and a font data 255, etc., as described above, are the print related information specific to a model of printers, and must be prepared to be applicable to the printer 1. Among these, despite of not being shown in the drawing, a program for rendering font, etc. (font renderer) is prepared as necessary.

Finally, an initialization program 252 is a part to realize a function characteristic in the printer 1, which proceeds with a process to acquire print related information such as the driver program 253, color table 254 and font data 255, etc., applicable to the printer 1 (the version applicable to the printer 1) from a prescribed location (driver distribution server 8 ) at a prescribed time such as when the printer 1 is turned on.

Figure 10:
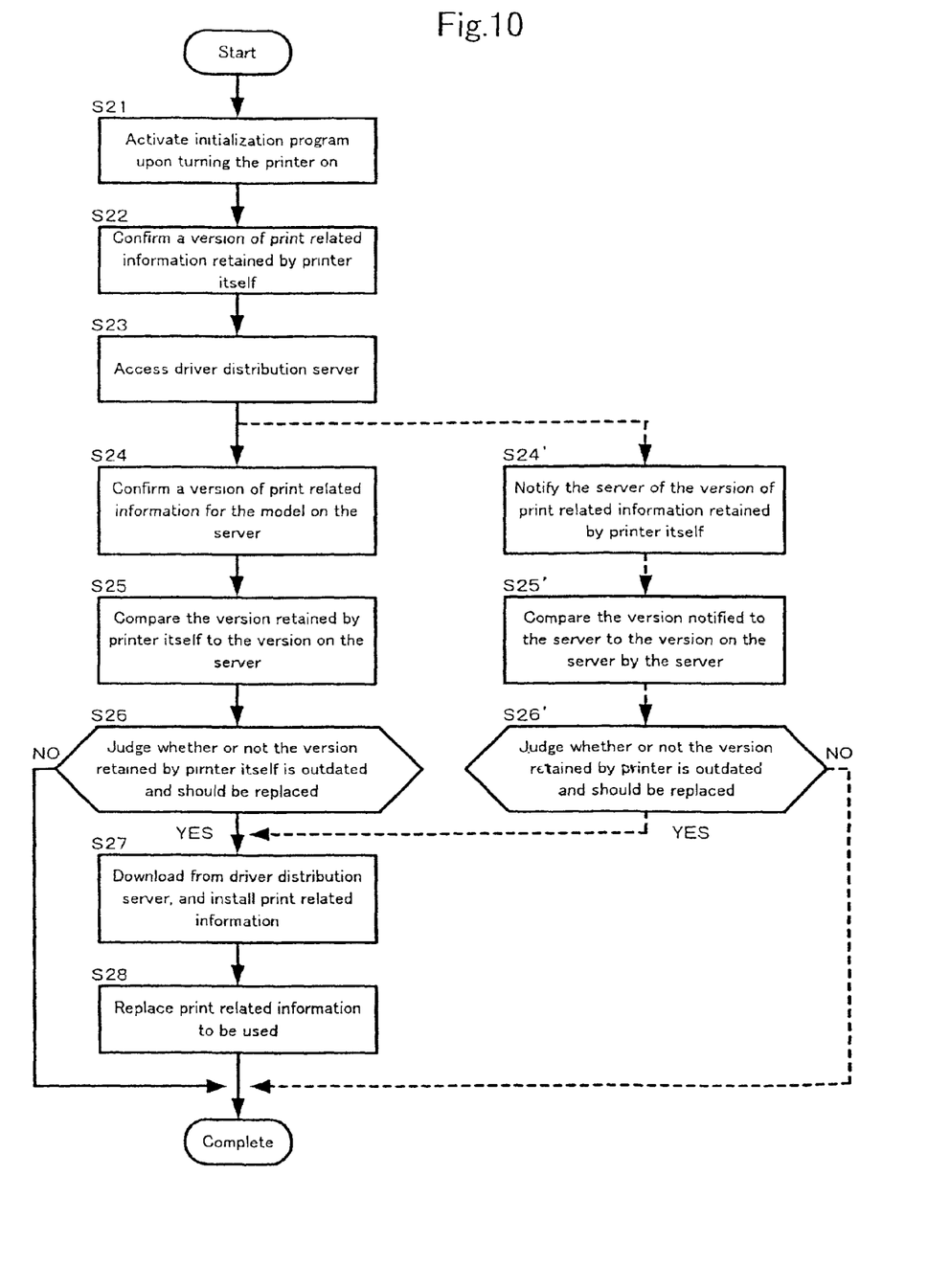
FIG. 10 is a flowchart showing a process conducted according to an initialization program 252 of Embodiment 2.

The inside of the printer 1 is configured as explained above, and hereafter explained is a processing flow for acquiring print related information in accordance with the initialization program 252. FIG. 10 is a drawing showing an example of the processing flow.

As shown in FIG. 10, when the printer 1 is turned on, first, the initialization program 252 is started (FIG. 10, step s21). The printer 1 confirms a version of print related information such as the driver program 253, color table 254, font data 255 and font renderer which are included in the flash ROM 25 of the printer 1 (FIG. 10, step S22).

Next, the printer 1 accesses the driver distribution server 8 on the network 5 which distributes print related information for the printer 1 via the network transceiving part 21, LAN 3 and network 5 (FIG. 10, step S23).

Here, the printer 1 may be configured to first access the location information distribution server 10. In such case, the printer 1 sends inquiry information, including the identification information of print related information for the printer 1, to the location information distribution server 10. The location information distribution server 10 comprises a database to store the location information of the driver distribution server 8 which prepares print related information by corresponding to the identification information of the print related information, and upon receiving the inquiry information from the printer 1, extracts the applicable location information from the database in accordance with the identification information of the print related information in the inquiry information, and sends the location information to the printer 1. Thereby, the printer 1 may access the driver distribution server 8 where the print related information for the printer 1 is stored in accordance with the received location information.

Next, the printer 1 confirms a version of print related information for the printer 1 prepared in the driver distribution server 8 (FIG. 10, step S24)

Next, the printer 1 compares the version of print related information retained on the printer 1 itself which is confirmed in the step S22 to the version on the server which is confirmed in the step S24 (FIG. 10, step S25).

As a result of the comparison, if these versions are the same, or the version retained by the printer 1 itself is newer (FIG. 10, Step S26, "No"), the printer 1 does not proceed with any specific process as it already retains the applicable print related information.

On the other hand, if the version retained on the printer 1 itself is older, and must be replaced with the newer print related information (FIG. 10, step S26, "Yes"), the print related information prepared in the driver distribution server 8 is downloaded, and the older print related information of the flash ROM 25 is replaced by the downloaded new print related information (FIG. 10, step S27).

Thereafter, upon generating print data, the updated version of the print related information is used by the time of the next update (FIG. 10, step S28). Moreover, even if the print related information retained on the printer 1 itself is an old version, it may be considered that it is not required to be replaced in the case in which there is little difference between the old version and the version prepared in the driver distribution server 8, for example, in the case of performance improvement only and not in order to correct a malfunction.

The comparison between the versions of the print related information, judgement whether or not the version is updated, and updating may be conducted with respect to each unit, the version of which is managed (e.g. every driver program or color table).

A processing flow describing with dotted line in FIG. 10 describes an example of another processing feature. In the processing flow describing with straight line in FIG. 10, the printer 1 compares the versions between the print related information retained on the printer 1 itself and the print related information retained on the driver distribution server 8, and judges whether or not the print related information is downloaded thereunder; on the contrary, in this example, the driver distribution server 8 undertakes such comparison and judgement. Accordingly, as shown in FIG. 10, steps S24, S25 and S26 are respectively replaced to steps S24', S25' and S26'.

Specifically, the printer 1, after accessing the driver distribution server 8 (FIG. 10, step S23), notifies the driver distribution server 8 of the version of the print related information retained on the printer 1 itself (FIG. 10, S24'), and the driver distribution server 8 undertakes the comparison (FIG. 10, step S25'), and judges, according to the results of the comparison, whether or not the print related information of the printer 1 should be replaced (FIG. 10, step S26'). The result of the judgement is sent to the printer 1, and thereafter the process is the same as the case in the processing flow describing with straight line.

Moreover, before accessing the driver distribution server 8 (or location information distribution server 10) (FIG. 10, step S23) or downloading from the driver distribution server 8 (FIG. 10, step S27), a step that an operator of the printer 1 judges whether or not it proceeds with the following process may be adopted, which enables an adequate response even in the case where it is not preferable to connect to the network 5, or it is not desirable to update the existing print related information.

In the example according to FIG. 10, although it is determined that the time the printer 1 acquires the print related information is the time when the power is turned on, alternatively, it may be the time when the printer 1 receives the instruction of a user of the printer 1. Specifically, it is the time when the printer 1 is activated by the buttons provided in the printer 1, etc., or receives the instruction thereof from a user via the LAN 3.

If the location where the driver distribution server 8 for providing the printer driver, etc. (e.g. an address on the network 5) is installed changes, and such change is previously known to the driver distribution server 8, the information of the future location to be accessed may be included to the downloaded print related information to be sent to the printer 1.

As explained according to FIG. 10, in the printer 1, the printer 1 itself updates the version of the print related information such as the driver program 253, etc., so that there is no inconvenience in this installation and updating operation.

Modified Example

As the font data 255 stored in the flash ROM 25 of the network board 2 (or the printer 1) generally has a large volume of data, it is not preferable to prepare, at any time, the current font data 255 and font renderer for all fonts considering the recording capacity or the processing speed according to the initialization program 252.

The same applies to the other print related information, and it may not be preferable to prepare, at any time, all of the print related information considering the recording capacity, etc.

Accordingly, in the network board 2 (or the printer 1), the print related information which is always required to generate the print data (dependent on the model of the printer), is highly versatile, or is frequently used, should preferably be installed. On the contrary, concerning the print related information which is specific to certain information resources, is low in versatility, or is infrequently used, it is desirable that it is installed or updated to the current version as necessary.

In the modified example, the print related information is classified to be managed according to the installation (acquirement) priority. Specifically, the print related information which is, dependent on a model of printers (e.g. printer driver or color conversion table, etc.), versatile, or frequently used (e.g. basic font data or font renderer, etc.) is classified into a high-priority installation group (hereinafter referred to as "resident group"), and the print related information which is specific to certain information, is not versatile, or is infrequently used (e.g. special font data or font renderer, etc.) is classified into a low-priority installation group (hereinafter referred to as "transient group"). This modified example is configured to improve the memory efficiency or processing speed by varying the time to acquire print related information, the judgement whether or not print related information should be acquired, or the area to be stored, in each group.

Figure 5:
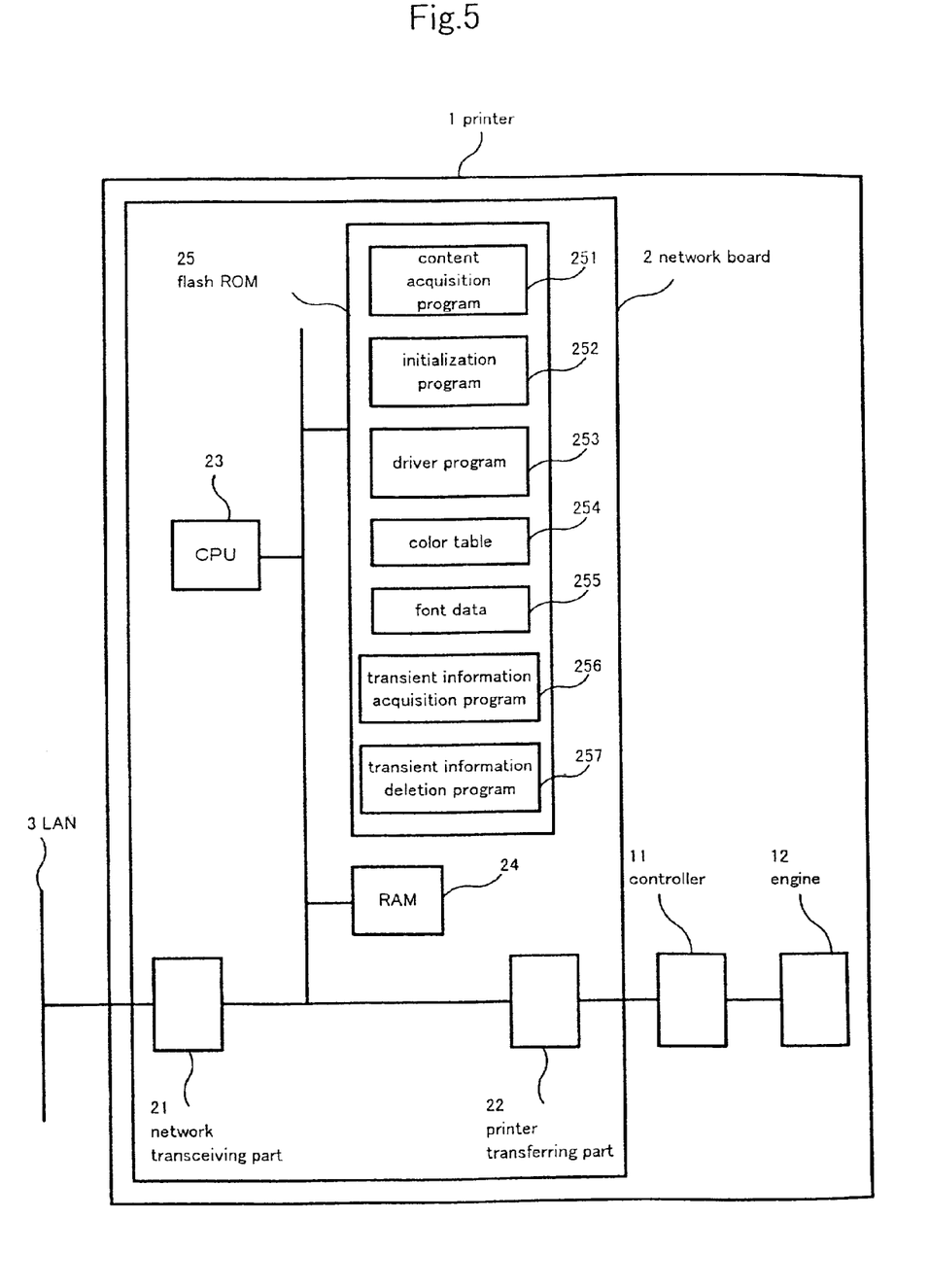
FIG. 5 is a drawing showing the internal configuration of a network board 2 related to the modified example of the present invention.
Figure 11:
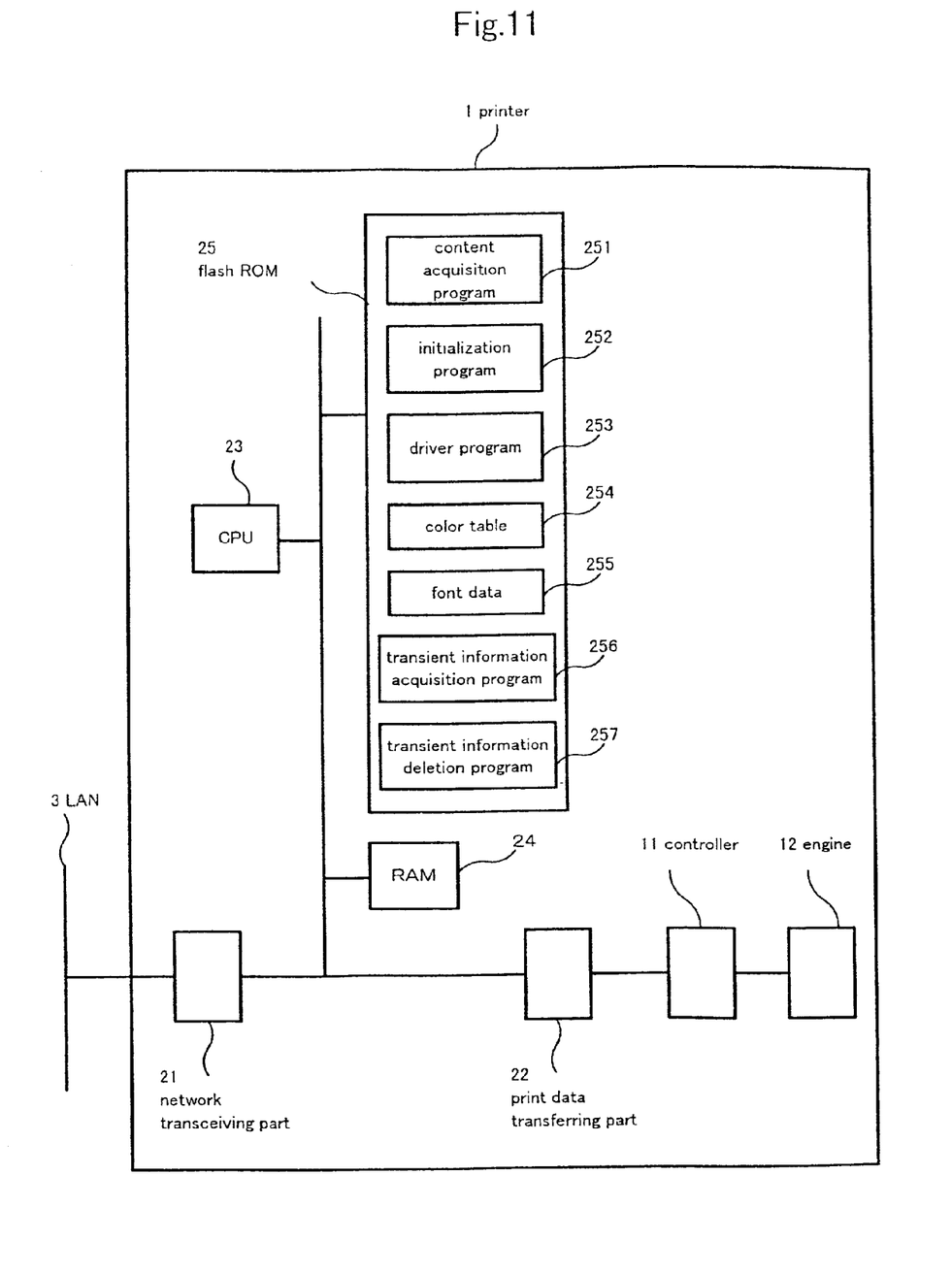
FIG. 11 is a drawing showing the internal configuration of a printer 1 related to the modified example of the present invention.

FIG. 5 is a drawing showing the internal configuration of the printer 1 according to the modified example. FIG. 11 is a drawing showing the internal configuration of the printer 1 according to the modified example in case that the printer 1 itself comprises the functional configuration of the network device.

As shown in the drawing, in the modified example, in addition to the configuration of the embodiments, the transient information acquisition program 256 and the transient information deletion program 257 are stored in the flash ROM 25. Explained below is the operation and configuration which is different from the embodiments.

The initialization program 252, in principle, conducts the same process as the processing flow in FIG. 3 (or FIG. 10). However, the initialization program 252 is considered to make an acquisition, judgement or to update only with regard to the print related information classified in the resident group.

The transient information acquisition program 256 is a program to make acquisition, judgement or update with regard to the print related information classified in the transient group.

Figure 6:
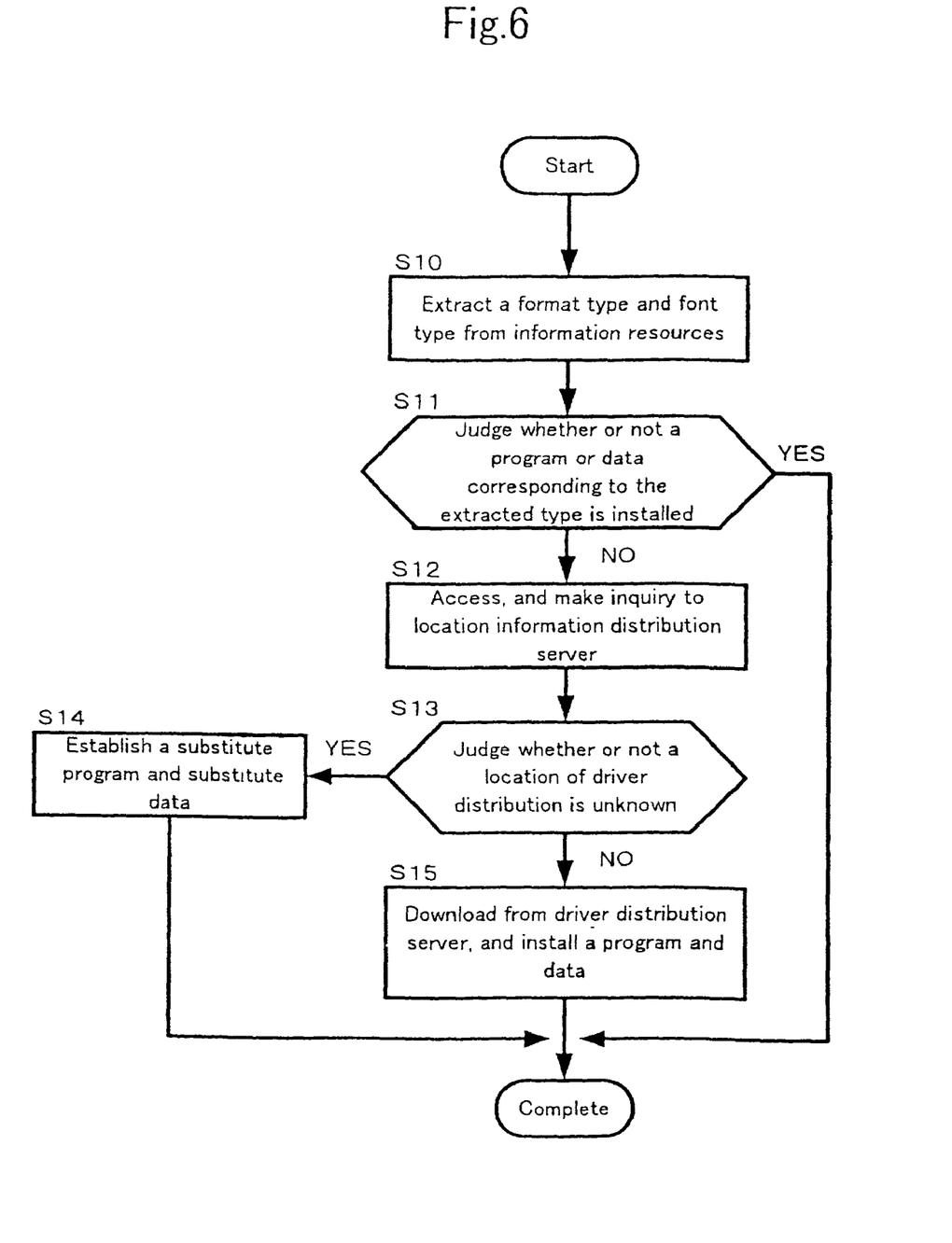
FIG. 6 is a flowchart showing the process conducted according to a transient information acquisition program.

Hereafter, explained is a processing flow conducted according to the transient information acquisition program. FIG. 6 is a drawing showing the processing flow. In the processing flow, as an example of the print related information classified in the transient group, the format interpreter program and font data are described.

The transient information acquisition program 256 activates when the content acquisition program 251 acquires the information resources to be printed.

Firstly, the network device 2 (or printer 1) extracts the format type of the information resources and the font type used in the acquired information resources in accordance with header information of them (FIG. 6, step S10).

Next, the network device 2 (or printer 1) judges whether or not the format interpreter program corresponding to the extracted format type and the font data corresponding to the extracted the font type are installed in the printer 1 (FIG. 6, step S11).

If it is judged that they are installed, the process is terminated. Consecutively, the driver program 253 activates to generate print data in accordance with the acquired information resources.

On the contrary, if it is judged that any of them are not installed (FIG. 6, step S11 "Yes"), the printer 1 accesses the location information distribution server 10 via the network transceiving part 21, LAN 3 and network 5, and makes an inquiry of the location of the applicable driver distribution server (FIG. 6, step S12). In case the location information is known, the printer 1 may directly access the driver distribution sever 8 on the network 5 where the non-installed format interpreter program or/and font data are distributed.

The location information distribution server 10 searches the database in response to the inquiry, and sends to the printer 1 the location information of the research result as response information. As a result of the research, if the location information is not found (if the applicable location is not registered in the database), the response information indicating that the location is unknown will be sent to the printer 1.

The printer 1 judges whether or not the response information received from the location information distribution server 10 indicates that the location is unknown (FIG. 6, step S13), and in case that the location is unknown, the format interpreter program or font data already installed in the printer 1 is set up as a substitute program or substitute font data.

On the contrary, if the response information received from the location information distribution server 10 indicates the location (FIG. 6, step S12 "No"), the printer 1 accesses the driver distribution server 8 of the location, the non-installed format interpreter program or/and font data are downloaded to be installed in the printer 1, and the process terminates (FIG. 6, step S14).

Next, explained is a transient information deletion program 257. The transient information deletion program 257 is a program which deletes the print related information classified in the transient group.

The transient information deletion program, for example, activates in the print completion stage. However, as the activating time is changeable depending on the design, the transient information deletion program 257 may be configured to activate in the stage of completion of generating the print data, or transferring the print data to the controller 11.

Specifically, the network device 2 (or printer 1) judges whether or not the print related information of the transient group is used to generate the print data, which are completed to be printed. If it is judged that the print related information of the transient group is not be used, the process terminates. On the contrary, if it is judged that the print related information of the transient group is used, it is uninstalled (deleted) from the network device 2 (or printer 1).

The configuration of such transient information acquisition program 256 and transient management program 257 enables control of the print related information classified in the transient group to be acquired only as necessary, and installed in the network device 2 (or printer 1) only for as long as necessary. As a result, the memory efficiency or processing speed of the network device 2 (or printer 1) may be improved.

Furthermore, it is conceivable that the transient information deletion program 257 is configured to periodically activate. In such case, it is desirable that the area where the printer related information is stored among the memory areas of the flash ROM 25 is categorized to be managed in at least two areas; of a memory area X where the information of the resident group is stored, and a memory area Y where the information of the transient group is stored. The transient information deletion program 257 regularly checks the activity ratio of the memory area Y, and in case the activity ratio is more than a certain ratio (e.g. more than 90%), concerning all print related information stored in the memory area Y, extracts the installation time or date or the frequency of use, etc., and uninstalls, for example, in the order of installation or frequency from lowest to highest.

As explained above, as the network device (or printer) according to the embodiments acquires for itself the program or data necessary for generating print data from a prescribed location on the network at the prescribed time, it eliminates the inconvenience of installation or updating the operation of the program or data. Moreover, in the modified embodiment, the font data and font renderer, etc. are managed as the print related information of the transient group, and the print related information of the transient group is acquired and installed when required, just during the required period, and only for the required part, so that it is capable of decreasing the recording capacity and increasing the speed of the process conducted at the prescribed time.

The present invention is not limited to the embodiments, but may be diversely modified for various uses. For example, the information resources received from outside are not limited to the information to be printed itself, but may include the location information such as the content distribution server, etc. where the information to be printed is stored. In such case, the network board of the present invention will specify a content distribution server, etc. to be accessed according to the information resources received outside the network, and further acquire the content (information resources) from the content distribution server to generate print data in accordance with the content.

The scope of the protection of the present invention is not limited to the embodiments, but covers the invention and equivalent thereof described in the claims.

As described above, according to the present invention, since the network board (or printer) itself appropriately acquires the print related information, it can facilitate the installation or update operation thereof, so that there is no inconvenience for the operator of the printer or host computer. Furthermore, the network board comprising such function is applicable to different models of the printers, and may become a network board which is more applicable for general purposes.

The entire disclosure of Japanese Patent Applications No. 2000-350818 filed on Nov. 17, 2000, No. 2001-319926 filed on Oct. 17, 2001 and No. 2001-319927 filed on Oct. 17, 2001, including specifications, claims, drawings and summaries are incorporated herein by reference in their entirety.

I claim:

1. A network device for generating print data in accordance with information resources received from outside, and sending said print data to a printer;
    characterized in that print related information necessary for generating said print data is appropriately acquired from a prescribed location on the network at a prescribed time;
    wherein said print data is generated by using said acquired print related information, and sent to said printer; and
    characterized in that, in the case where the prescribed location where the print related information is installed changes to a different prescribed location, the print related information which is acquired from the prescribed location on said network contains information concerning the different prescribed location on said network to be accessed upon the next acquisition of said print related information.

2. A printer generating print data in accordance with information resources received from outside, and executing printing;
    characterized in that print related information necessary for generating said print data is appropriately acquired from a prescribed location on a network at a prescribed time;
    wherein said print data is generated and printed by using said acquired print related information; and
    characterized in that, in the case where the prescribed location where the print related information is installed changes to a different prescribed location, the print related information which is acquired from the prescribed location on said network contains information concerning a different server on said network to be accessed as the different prescribed location upon the next acquisition of said print related information.

* * * * *